United States Patent [19]

Saito

[11] Patent Number: 4,482,936
[45] Date of Patent: Nov. 13, 1984

[54] DRAWER TYPE ENCLOSED SWITCHBOARD WITH AUTOMATIC GROUNDING DEVICE

[75] Inventor: Kouji Saito, Togitsu, Japan

[73] Assignee: Mitsubishi Denki Kabushiki Kaisha, Japan

[21] Appl. No.: 475,763

[22] Filed: Mar. 16, 1983

[30] Foreign Application Priority Data

Mar. 31, 1982 [JP] Japan .................................. 57-55835

[51] Int. Cl.³ .............................................. H02B 1/04
[52] U.S. Cl. .................................. 361/336; 361/337; 361/343; 200/50 AA
[58] Field of Search .................................. 200/50 AA; 361/335–339, 341, 343, 344, 390, 391

[56] References Cited

FOREIGN PATENT DOCUMENTS 54-40301 12/1979 Japan .
57-7809 1/1982 Japan .

Primary Examiner—G. P. Tolin
Attorney, Agent, or Firm—Leydig, Voit, Osann, Mayer and Holt, Ltd.

[57] ABSTRACT

In a drawer type enclosed switchboard in which equipment constituting a main circuit are built and which includes an inner truck device for connecting or disconnecting the main circuit through its horizontal movement, and an outer truck device supporting the inner truck device and being received in the switchboard proper; a drawer type enclosed switchboard comprising an automatic grounding device which is held in engagement with an operating mechanism permitted to electrically connect and disconnect the inner truck device by means of an operating handle grip at the front surface of the outer truck device serving as the panel of the switchboard, and which automatically grounds the load side of the main circuit only in case of an entire disconnecting operation.

3 Claims, 11 Drawing Figures

FIG. 2

DRAWER TYPE ENCLOSED SWITCHBOARD WITH AUTOMATIC GROUNDING DEVICE

BACKGROUND OF THE INVENTION

This invention relates to a drawer type enclosed switchboard equipped with an automatic grounding device.

Heretofore, a drawer type enclosed switchboard has not been equipped with any grounding device.

The conventional drawer type enclosed switchboard without grounding members is constructed of a switchboard proper 1, and has an outer truck device 26 which is held in engagement with the switchboard proper 1, and an inner truck device 34 which moves horizontally inside the outer truck device 26 and which has main circuit equipment built therein. An operating lever 48 for panel operations is disposed in a manner to penetrate through a faceplate 28 at the front surface of the outer truck device 26, and an operating circular lever 47 and an operating mechanism-rotary shaft 46, which are directly connected to the operating lever 48, are received in an operating box 32, whereby a rotary operating mechanism is constructed. A rotary arm 49 is attached to the operating mechanism-rotary shaft 46, and is provided with a guide pin 50 for operating the inner truck. Further, the guide pin 50 is held in engagement with a guide rail slot 45 which is formed in a guide seat 44 provided at the front surface of the inner truck. Owing to the above state of engagement, the operation of rotating the operating lever 48 is converted into a horizontal motion on the basis of the relationship of engagement between the rotary arm 49 for operating the inner truck and the guide rail slot 45 of the inner truck, whereby the movement of the inner truck and the operation of disconnecting a main electric circuit become possible.

Since the conventional drawer type enclosed switchboard is constructed as described above, the load side circuit of the main circuit needs to be grounded separately from the above arrangement in order to prevent an accident due to electric shock when the switchboard is inspected during maintenance. Accordingly, in the enclosed switchboard which has the primary disconnecting portion of the automatic connection type on the truck device, it has been necessary that, after the truck portion has been drawn out of the switchboard, a load side terminal of each phase is grounded by means of a ground rod at the rear of the switchboard, or that a grounding operation is performed by providing a separate grounding device of a truck type into the switchboard instead of the truck.

Such grounding operations in the prior art have had the disadvantage that a long time is required for the operations. Further, in the case of employing the grounding device separate from the truck device, the truck portion must be completely removed out of the switchboard in order to execute the grounding operation, and hence, the inspection area becomes small. Moreover, in a case where the grounding operation is performed for a large number of switchboards, the grounding device is shared, so that the time required for a service interruption becomes long and a safe operation of maintenance inspection cannot be efficiently performed. In addition, since the grounding device is an accessory component separate from the truck device, it is demeritorious in cost, as well as requiring a custody space when not being used.

SUMMARY OF THE INVENTION

This invention has been made in order to eliminate the disadvantages of the prior art as mentioned above, and has for its object to provide a drawer type enclosed switchboard with an automatic grounding device in which a lever for operating an inner truck device and disposed at the panel of the drawer type enclosed switchboard is held in engagement with a grounding device within the switchboard, whereby the load side of a main circuit can be automatically and reliably grounded collectively for three phases after a disconnecting portion for the main circuit disposed on the inner truck device has been operated for disconnection.

BRIEF DESCRIPTION OF THE DRAWINGS

FIGS. 2 to 4 are side views showing the operating steps of a drawer type enclosed switchboard including one embodiment of this invention;

In the drawings, the same symbols indicate the same parts.

DESCRIPTION OF THE PREFERRED EMBODIMENTS

Figure 1:
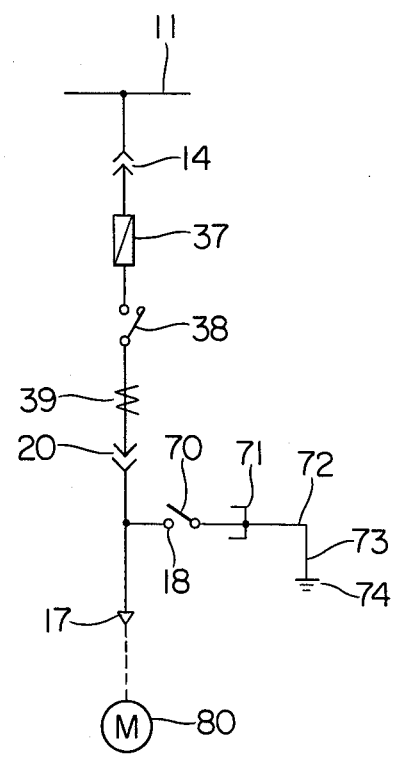
FIG. 1 is a single-line circuit diagram showing an embodiment of a drawer type enclosed switchboard according to this invention.

Now, an embodiment of this invention will be described with reference to the drawings. In the description, symbols indicative of various constituents will be first explained, and the relations among the constituents will be secondly explained. Numeral 1 designates a switchboard proper. Constituents 2 to 9 concern a control circuit, in which numeral 2 denotes a control circuit unit door, numeral 3 a handle grip for the control circuit unit door, numeral 4 components mounted on a door face, numeral 5 a control circuit unit, numeral 6 internal components of the control circuit, numeral 7 an external cable leading-in port of the control circuit, numeral 8 an external cable leading-in unit of the control circuit, and numeral 9 a control cable duct. Constituents 10 to 25 concern a main circut, in which numeral 10 denotes a power supply unit of the main circuit, numeral 11 a power supply bus conductor of the main circuit, numeral 12 a power supply branch bus conductor of the main circuit, numeral 13 a power supply side porcelain tube of the main circuit, numeral 14 a power supply side contactor of the main circuit, numeral 15 a load cable leading-in port of the main circuit, numeral 16 a load cable leading-in unit of the main circuit, numeral 17 a load cable leading-in terminal of the main circuit, numeral 18 an earth terminal, numeral 19 a load side porcelain tube of the main circuit, numeral 20 a load side contactor of the main circuit, numeral 21 an insulator, and numerals 22–25 internal partition covers. Constituent 26 to 32 concern an outer truck device, in which numeral 26 denotes the outer truck device proper, numeral 27 each lower wheel of the outer truck, numeral 28 a faceplate, numeral 29 a grip, numeral 30 each upper rail of the outer truck, numeral 31 each lower rail of the outer truck, and numeral 32 an operating box. Shown at numeral 33 is a main circuit unit. Constituents 34 to 54 concern an inner truck device, in which numeral 34 denotes the inner truck device proper, numeral 35 a power supply side insulator of the inner truck device, numeral 36 a power supply side conductor of the inner truck device, numeral 37 a power fuse (FIG. 1), numeral 38 an electromagnetic contactor unit (FIG. 1), numeral 39 a CT (FIG. 1), numeral 40 a load side insulator of the inner truck device, numeral 41 a load side conductor of the inner truck device, numeral 42 each lower wheel of the inner truck, numeral 43 each upper wheel of the inner truck, numeral 44 a guide seat provided at the front surface of the inner truck device, numeral 45 a guide rail slot provided in the guide seat, numeral 46 an operating mechanism-rotary shaft, numeral 47 an operating circular lever, numeral 48 an operating lever, numeral 49 a rotary arm for operating the inner truck, numeral 50 a guide pin for operating the inner truck, numerals 51 and 52 plummer blocks, numeral 53 an end block, and numeral 54 a slit provided in the operating box 32. In a grounding device G, numeral 55 denotes a rotary arm for the grounding device, numeral 56 a movable pin for the grounding device, numeral 57 a movable lever for the grounding device, numeral 58 a guide slit open at one end and formed in the movable lever for the grounding device, numeral 59 an elliptical pin slot formed in the other end of the movable lever for the grounding device, numeral 60 the fulcrum pin of the movable lever for the grounding device, numeral 61 a pin for preventing the movable lever from falling off, numeral 62 a rotary shaft for the grounding device, numeral 63 a movable grounding conductor-fixing seat, numeral 64 a movable arm for the grounding device, numeral 65 a pin for the engagement between the movable lever and the movable arm, numeral 66 an engaging pin, numerals 67 and 68 bearings for the rotary shaft for the grounding device, numeral 69 a movable grounding conductor, numeral 70 a grounding blade, numeral 71 a grounding short-circuit conductor, numeral 72 a grounding flexible conductor, numeral 73 a grounding vertical conductor, numeral 74 a grounding bus conductor, numeral 75 a clip member for the grounded state of the movable lever, and numeral 76 a clip member for the non-grounded state of the movable lever. Numeral 77 indicates the direction of a disconnecting operation for the operating lever, numeral 78 the direction of another disconnecting operation, and numeral 79 the direction of an inserting direction for the operating lever. Shown at numeral 80 is a load which is connected to the circuit. The relationships among these various constituents will be successively explained in the ensuing concrete description.

FIG. 1 is a single-line circuit diagram of an embodiment of this invention. The load cable leading-in terminal 17 is connected to the power supply bus conductor 11 of the main circuit through the power supply side contactor 14 of the main circuit, the power fuse 37, the electromagnetic contactor unit 38, the CT 39 and the load side contactor 20 of the main circuit. The load 80 such as a motor is connected in a subordinate position to this load cable leading-in terminal 17. Further, the grounding terminal 18 is connected between the load cable leading-in terminal 17 and the contactor 20. The grounding blade 70 for switching a grounding circuit is connected in a subordinate position to the grounding terminal 18, which is connected through the grounding blade 70 and the short-circuit conductor 71 to the grounding flexible conductor 72, the grounding vertical conductor 73 and the grounding bus conductor 74. As will be described later, the grounding blade 70 is so constructed as to be automatically closed when the contactors 14 and 20 are in their disconnected positions. Since the load cable leading-in terminal side 17 is reliably grounded by closing the grounding blade 70, the maintenance inspection can be safely and reliably performed.

Figure 2:
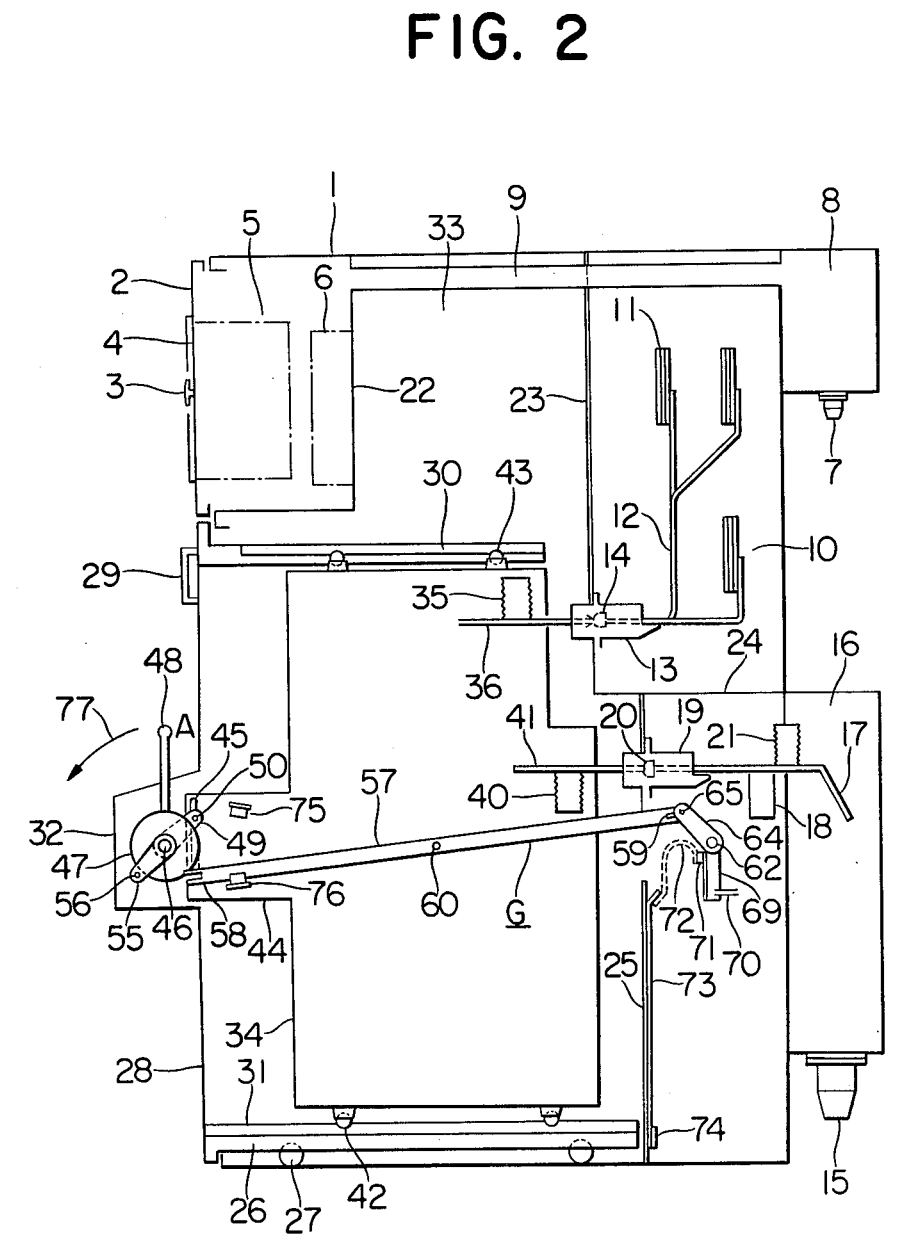

FIG. 2 is a side view showing the practicable arrangement of one embodiment of this invention. It illustrates the state in which the outer truck device 26 is carried in the switchboard proper 1, the inner truck device 34 has the conductors 36 and 41 inserted in the respective contactors 14 and 20, and the grounding device G has the grounding blade 70 and the terminal 18 disconnected. In the upward position A of the operating lever 48 at the switchboard panel as shown in the figure, the inner truck device 26 has the conductors 36 and 41 inserted in the power supply side and load side contactors 14 and 20 of the main circuit respectively, owing to the relationship between the operating mechanism-rotary shaft 46 directly coupled with this operating lever 48 and the guide rail slot 45 of the guide seat 44 held in engagement with the guide pin 50 as well as the rotary arm 49 for operating the inner truck. Under this state, the grounding device-rotary arm 55 directly coupled with the operating mechanism-rotary shaft 46 is not in engagement with the movable lever 57 at all, so that the grounding device G is not operating at all. That is, the grounding blade 70 is not closed with the load side grounding terminal 18 of the main circuit.

Figure 3:
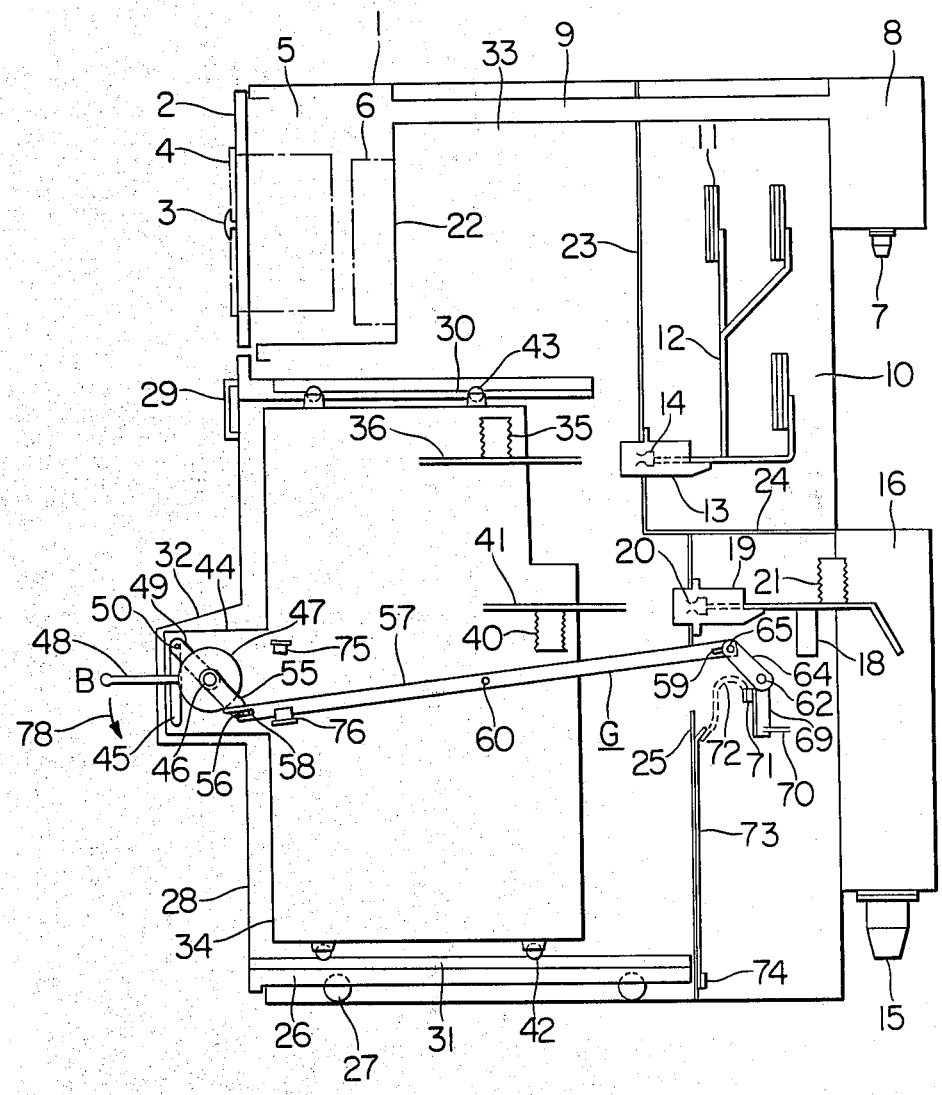

FIG. 3 illustrates the position B of the operating lever 48 in the course of its operation. Under this state, it can be seen that the inner truck device proper 34 has the conductors 36 and 41 perfectly disconnected from the respective contactors 14 and 20, the rotary arm 55 as well as the movable pin 56 for the grounding device have just come into engagement with the movable lever 57 for the grounding device and have not started a grounding operation yet, so the grounding blade 70 and the load side grounding terminal 18 of the main circuit are not closed.

Figure 4:
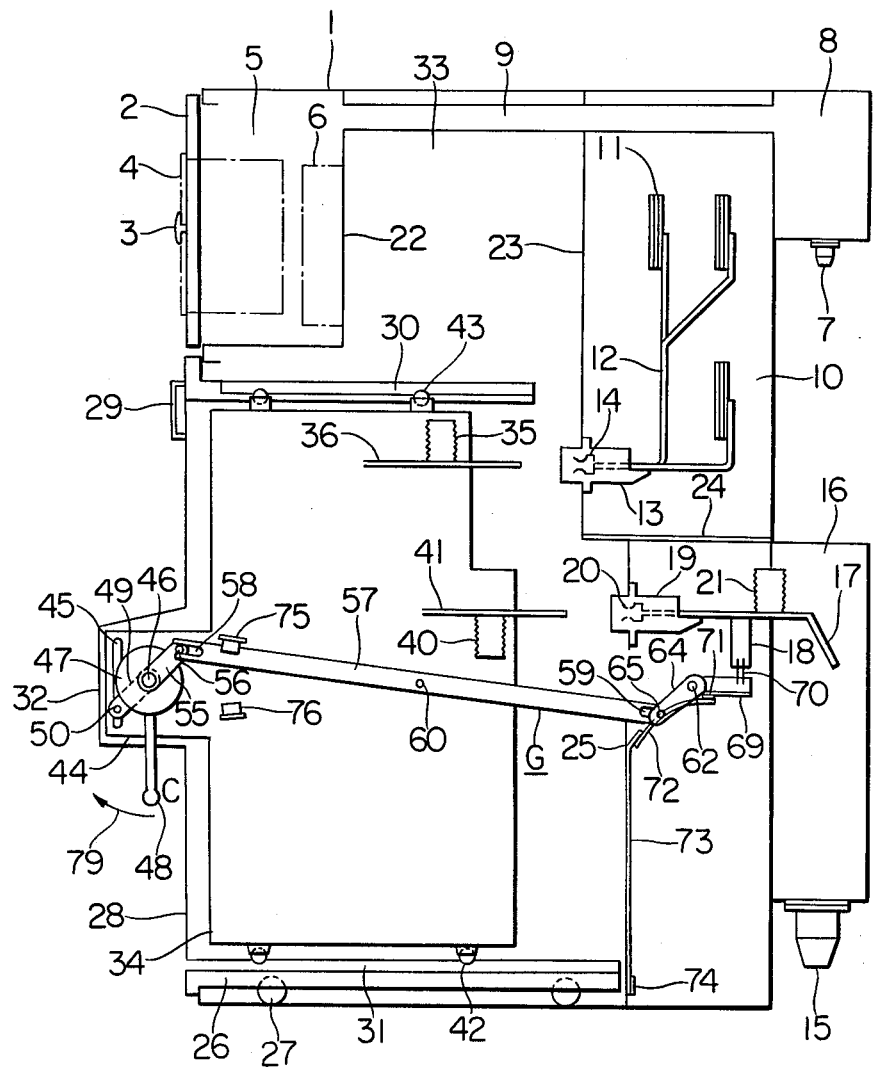

FIG. 4 illustrates the position C at which the disconnecting operation of the operating lever 48 has been completed. In this state, the rotary arm 55 for the grounding device engages the movable lever 57, to reliably close the grounding blade 70 and the stationary grounding terminal 18, so that the load circuit is grounded (FIG. 1). In addition, the outer truck device proper 26 bearing the inner truck device proper 34 can be transported out of the switchboard proper 1 as shown in FIG. 11.

Figure 5:
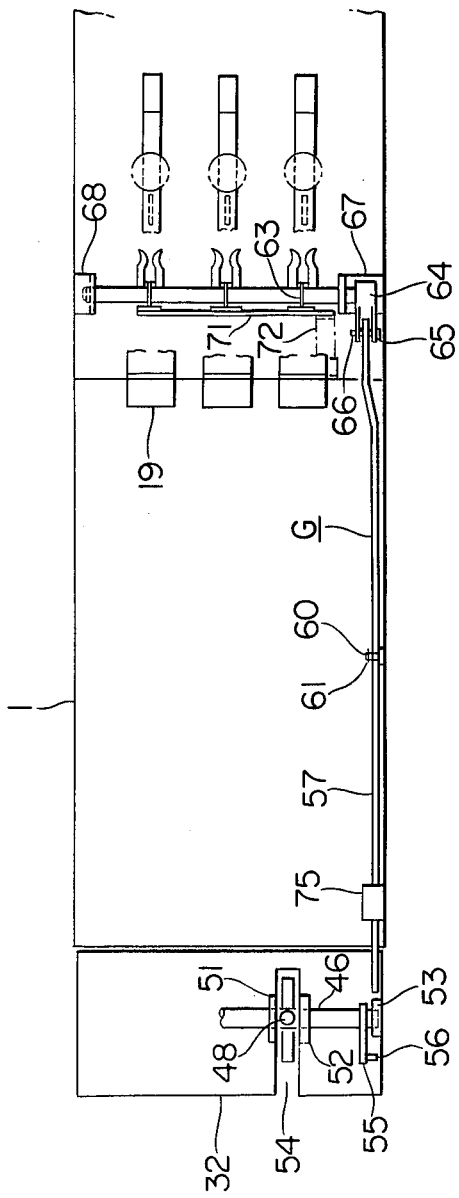
FIGS. 5 and 6, FIGS. 7 and 8 and FIGS. 9 and 10 are plan views and sectional views of a grounding device embodying this invention.
Figure 6:
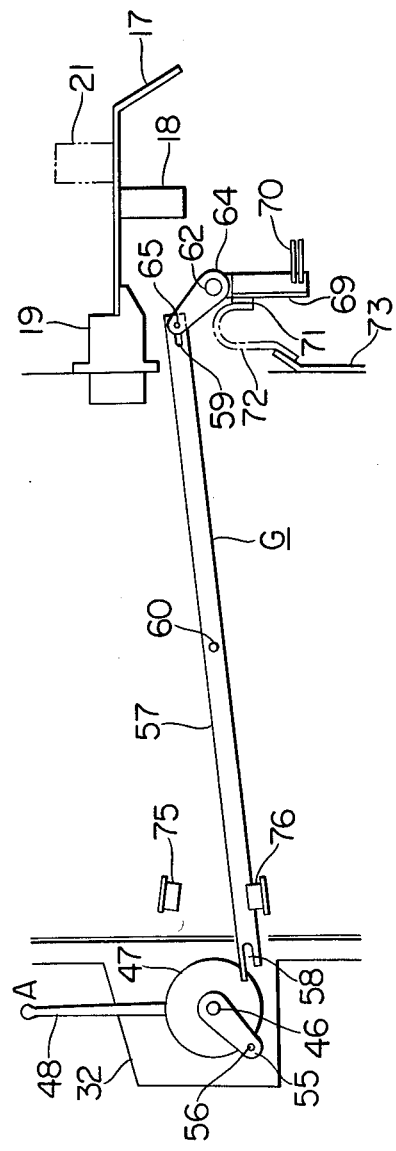
Figure 7:
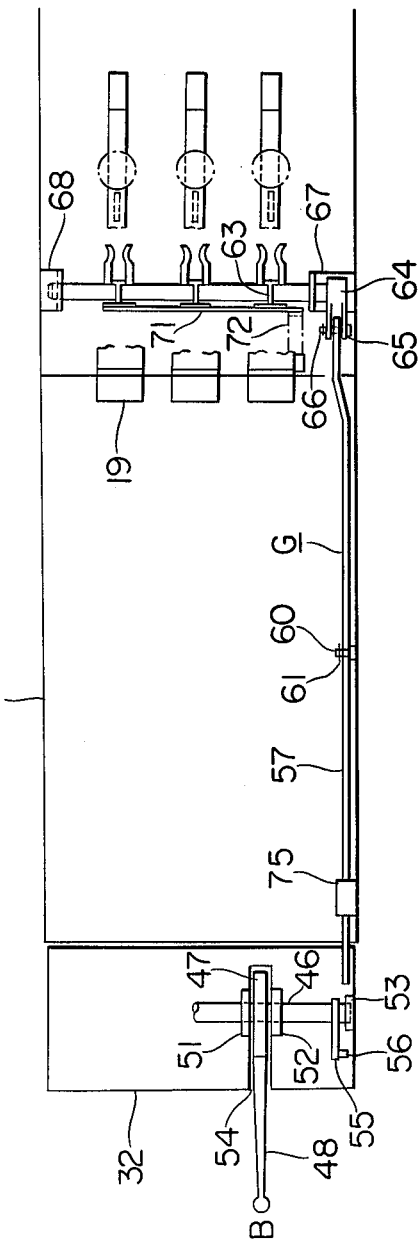
Figure 8:
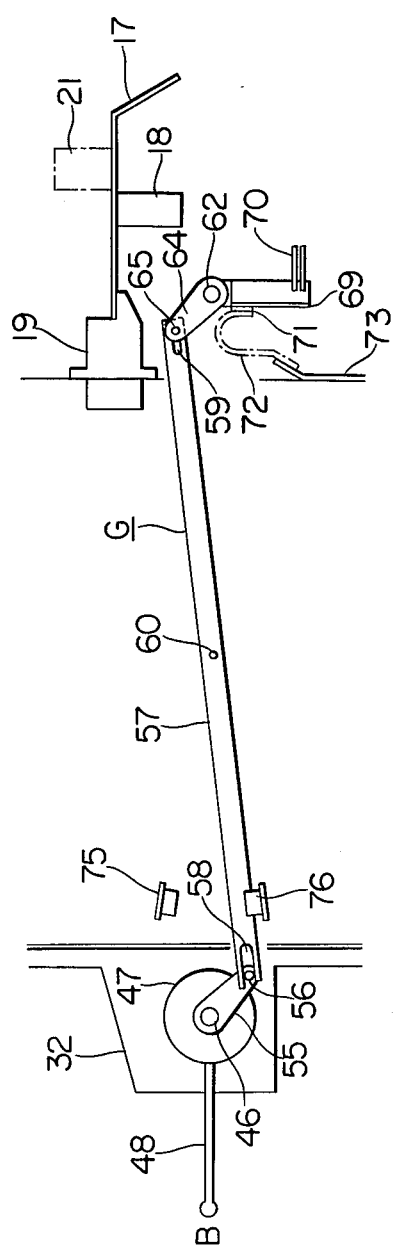
Figure 9:
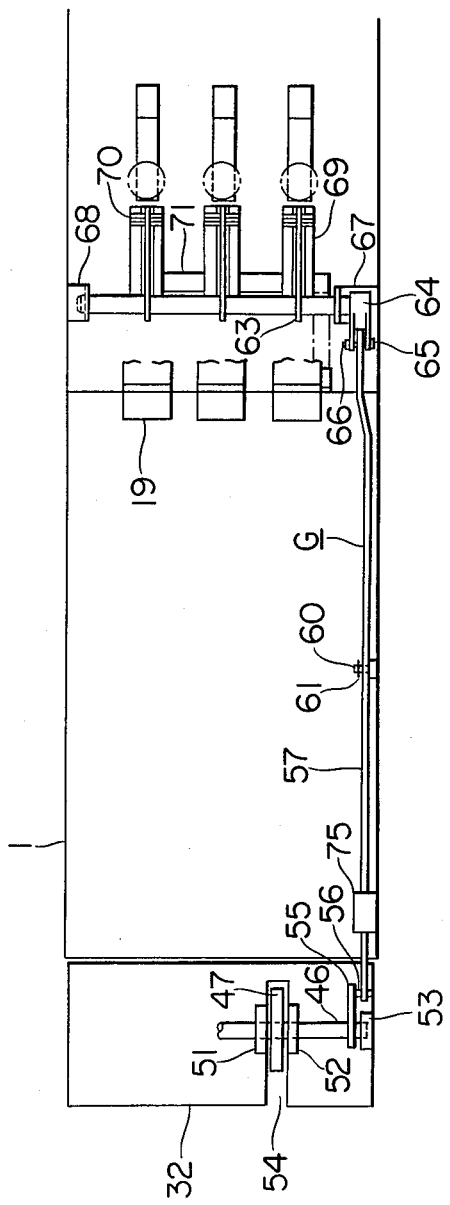
Figure 10:
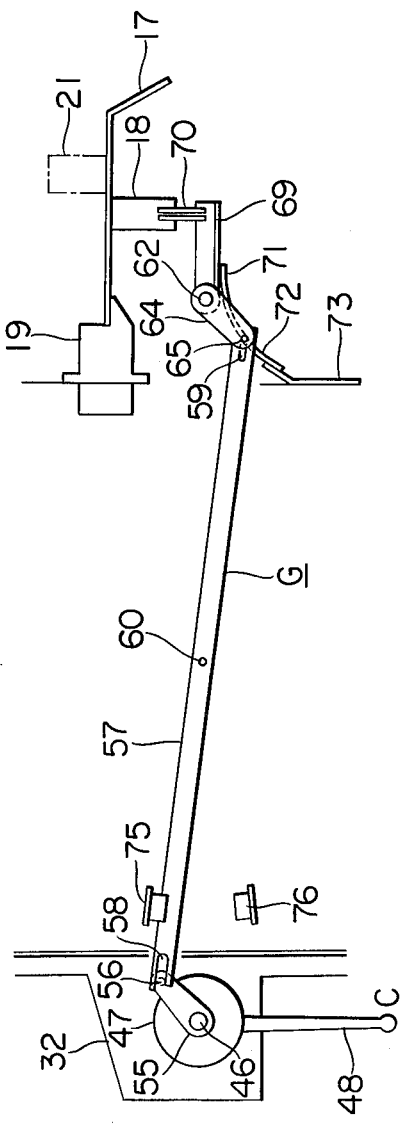

FIGS. 5 to 10 show the details of the plan and side elevation views of the automatic grounding device G in FIGS. 2 to 4. FIGS. 5 and 6 are plan and side views before the operation of the operating lever 48, respectively, in which the grounding blade of the automatic grounding mechanism is not closed. FIGS. 7 and 8 are plan and side views in the course of the disconnecting operation of the operating lever 48, respectively. In this state, the contactors 14 and 20 of the main circuit and the corresponding conductors 36 and 41 are perfectly disconnected as shown in FIG. 3, but the grounding blade 70 on the load side of the main circuit is not closed with the terminal 18 yet. FIGS. 9 and 10 are plan and side views of the operation at position C in which the operating panel lever 48 has effected the entire disconnection. Besides the state in which the main circuit is entirely disconnected as described above, the grounding blade 70 is closed with the load side grounding terminal 18 of the main circuit, to construct the grounding circuit as shown in FIG. 1.

Figure 11:
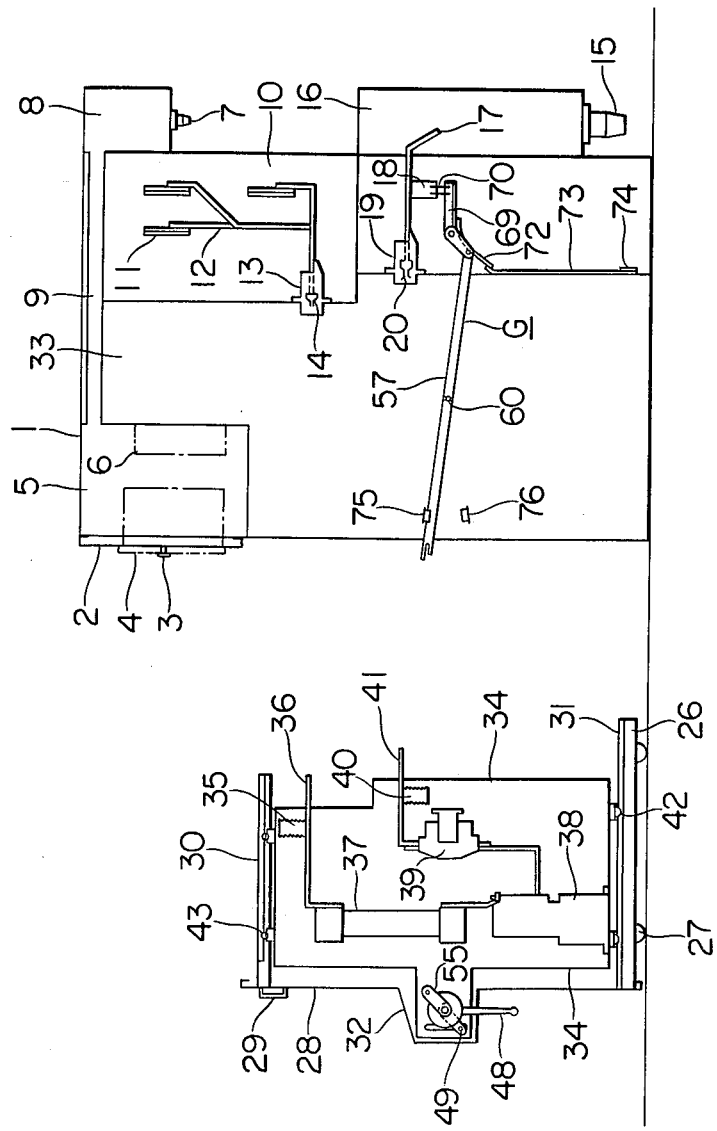
FIG. 11 is a side view showing the state in which an outer truck device loaded with an inner truck device has been carried out of a switchboard proper.

FIG. 11 shows the state in which the outer truck device proper 26 with the inner truck device proper 34 placed thereon has been transported out of the switchboard proper 1. Herein, the load side grounding terminal 18 of the main circuit and the grounding blade 70 remain in the closed state.

Next, there will be described the operation of the automatic grounding device of the drawer type enclosed switchboard constructed as stated above.

In the state of FIG. 2 in which the operating lever 48 is in the position A, the grounding device-rotary arm 55 directly coupled with the operating mechanism-rotary shaft 46 is not held in engagement with the movable lever 57 of the grounding mechanism at all, and hence, the grounding device is not operating at all. That is, the grounding blade 70 and the load side grounding terminal 18 of the main circuit are not closed.

Now, the case of FIG. 3 where the operating lever 48 is in the position B in the course of the disconnecting operation and the case of FIG. 4 where it is in the position C of the completed disconnecting operation will be explained.

The movable lever 57 is attached to the fulcrum pin 60 disposed on a side of the switchboard device proper, and executes a turning motion vertical about this fulcrum pin. Accordingly, the circular motion of the grounding device-rotary arm 55 directly coupled with the operating mechanism-rotary shaft 46, as well as the movable pin 56 at the end thereof remotest from the shaft 46, is converted into the vertical motion of the movable lever 57 about the fulcrum pin 60 owing to the engagement of the pin 56 with the guide slit 58 formed in the lever 57. Further, owing to the movable pin 65 which holds the grounding device-rotary arm 64 in engagement with the elliptical pin slot 59 worked in the end of the movable lever 57 remote from the slit 58, the grounding device-rotary shaft 62 directly coupled with the grounding device-rotary arm 64 is operated. The rotary shaft 62 is rotated about the rotary shaft bearings 67 and 68 disposed on the right and left sides of the switchboard proper, and hence, the grounding movable conductor 69 fixed to the rotary shaft 62 and the blade 70 mounted thereon effect circular motions, whereby the switching operation between the grounding movable conductor 69 and the grounding terminal 18 on the stationary side and the grounding circuit is automatically performed. Moreover, since the grounding operation is effected collectively for three phases, the grounding movable conductors 69 of the respective phases are short-circuited by the grounding short-circuit conductor 71 and then connected to the grounding bus conductor 74 through the flexible grounding conductor 72 as well as the vertical grounding conductor 73. The movable lever 57 is fixed by the clip member 75 or 76, which is disposed on the inner side surface of the switchboard device proper 1, in the grounded state or the non-grounded state, thereby preventing the erroneous operations of the grounding blade ascribable to vibrations, etc.

Further, in the course of the operation of the operating lever 48, the possibility of any malfunction occuring such as a three-phase short-circuit fault of the main circuit power supply is fully eliminated in order to operate the automatic grounding mechanism after the entire disconnection of the main circuit. In addition, the engagement between the movable pin 56 provided in the grounding device-rotary arm 55 and the guide slit 58 formed in the movable lever 57 can be readily released when, in the completed operation position C of the operating lever 48, the outer truck device proper 26 with the inner truck device proper 34 placed thereon is transported out of the switchboard proper 1. Accordingly, when the outer truck device has been transported out, the terminal 18 and the grounding blade 70 of the grounding device can be held closed.

In the above embodiment, the movable lever 57 for the grounding device is shown as being mounted on the right side in the plan views (FIGS. 5, 7 and 9). It is obvious, however, that the movable lever 57 may be mounted on the left side, and the same effects as in the foregoing embodiment can be achieved.

As set forth above, according to this invention, the load side main circuit is automatically grounded in the process of the main circuit disconnecting operation of the operating lever. Therefore, the grounding operation during maintenance and inspection of the load side lines can be performed safely, reliably and smoothly, so that the period of time of the grounding operation can be shortened. In addition, the load side lines can be grounded without transporting a main circuit truck out of the switchboard device proper. Further, since a truck type grounding device need not be furnished instead of the main circuit truck, an effective working space can be provided surrounding the switchboard and passageway during maintenance and inspection, and accessory equipment, such as the truck type grounding device, which are demeritorious in cost and in space are dispensed with.

The drawer truck can be transported out of the enclosed switchboard proper in the state in which the load side lines are grounded, as shown in FIG. 11, so that the maintenance and inspection of the interior of the switchboard can be safely performed.

What is claimed is:

1. A drawer type enclosed switchboard adapted to be automatically grounded, comprising:
   a switchboard proper which has a separate switchboard in its front;
   an outer truck device which is fastened to said switchboard and which is drawably received in said switchboard proper;
   an inner truck device which is movably placed on said outer truck device;
   a contactor on a power supply side of a main circuit, which is mounted on said switchboard proper;
   a conductor on the load side of the main circuit, which is mounted on said inner truck device and which is brought into and out of engagement with the main circuit power supply side contactor in accordance with the movement of said inner truck device;
   an operating handle grip which is attached to a turning shaft mounted on said switchboard;
   a rotary arm for operating said inner truck device, which has one end part thereof fastened to said turning shaft and is provided at the other end part thereof with a guide pin held in engagement with a guide rail slot formed in said inner truck device and which moves said inner truck device on said outer truck device in accordance with a turning operation of said operating handle grip;

a grounding device which includes a stationary grounding terminal and a movable lever grounding blade which are disposed on said grounding device proper and which are openable and closable therebetween, and a movable lever for a grounding operation that has one end part thereof held in engagement with said grounding blade and that has a turning fulcrum thereof supported by said inner truck device; and a rotary arm for the grounding operation, which has one end part thereof fastened to said turning shaft of said switchboard and is provided at the other end part thereof with a movable pin that is engageable with and disengageable from said movable lever and which closes said grounding device by coming into engagement with said movable lever for the grounding operation after the engagement between the main circuit power supply side contactor and the main circuit load side conductor has been released in accordance with the turning operation of said operating handle grip.

2. A drawer type enclosed switchboard adapted to be automatically grounded as defined in claim 1, wherein a guide slit having an open end is provided at one end of the grounding operation-movable lever closer to said operating handle grip, and said movable pin of the grounding operation-rotary arm comes into engagement with said guide slit when the turning operation of said operating handle grip has reached a final stage position.

3. A drawer type enclosed switchboard adapted to be automatically grounded as defined in claim 1, wherein the engagement between the grounding operation-movable lever and the grounding operation-rotary arm is released with said grounding device held closed, when said outer truck device with said inner truck device placed thereon is drawn out of said switchboard proper.

* * * * *